Jan. 16, 1968
W. H. RUEHLE ET AL  3,363,457
METHODS OF MEASUREMENT OF RADIANT ENERGY FROM
SUBSURFACE FORMATIONS
Filed Feb. 19, 1965
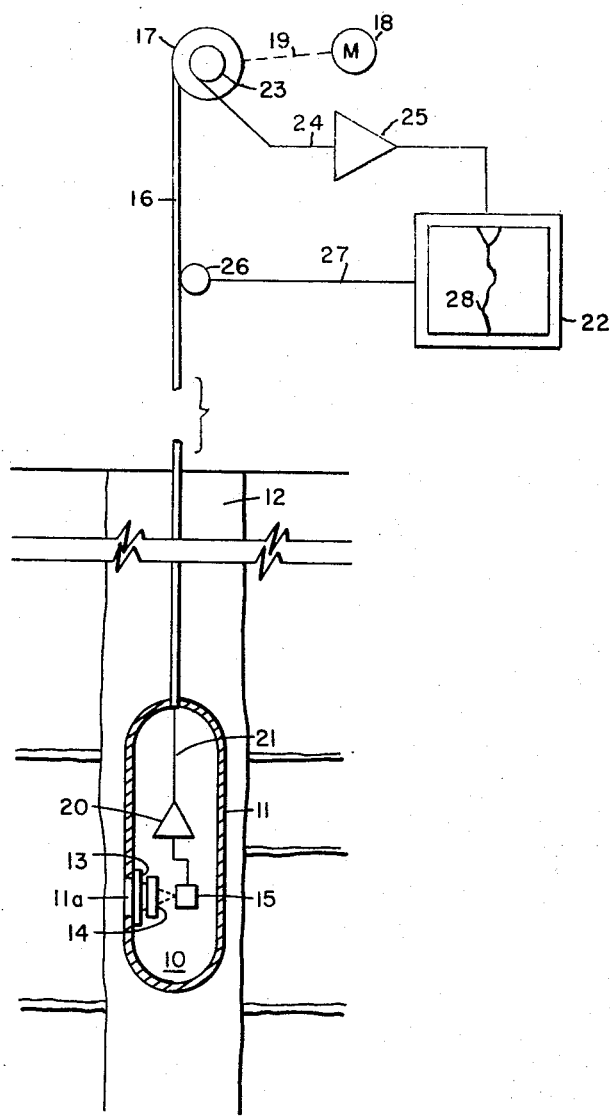
FIG I
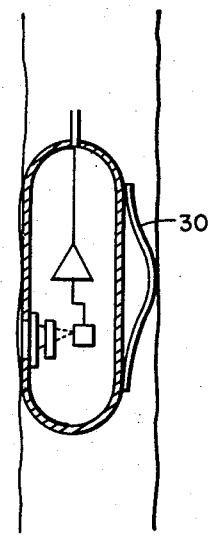
FIG III
INVENTORS
WILLIAM H. RUEHLE
JOHN R. ZIMMERMAN, Jr.
ATTORNEY

United States Patent Office 3,363,457
Patented Jan. 16, 1968

---

3,363,457
METHODS OF MEASUREMENT OF RADIANT ENERGY FROM SUBSURFACE FORMATIONS
William H. Ruehle and John R. Zimmerman, Jr., Dallas, Tex., assignors to Mobil Oil Corporation, a corporation of New York
Filed Feb. 19, 1965, Ser. No. 434,018
8 Claims. (Cl. 73—154)

ABSTRACT OF THE DISCLOSURE

The measurement of infrared radiation emanating from the walls of a borehole to obtain information about heat flow from the formations.

---

This invention relates to the measurement of radiant energy from subsurface formations to obtain information indicative of temperature and heat flow and more particularly to the measurement of the infrared radiation emitted by the formations traversed by a borehole.

In geophysical exploration, it is desirable to measure thermal properties of subsurface formations to determine certain subsurface characteristics useful, for example, in the search for oil. In well logging operations, temperature surveys or temperature measurements within well bores are carried out in an attempt to obtain the desired information. In these operations a temperature detector is lowered into the borehole. The detectors which have been employed in the past are of the thermocouple or thermistor type which depend primarily upon heat conduction through the borehole fluid to obtain a measure of temperature. The temperature measured with such detectors, however, is not necessarily an accurate indication of the thermal properties or temperature of the subsurface formations opposite the detector. More particularly, convection currents through the fluid (whether liquid or air) may cause the temperature of the fluid at the detector to vary from that of the formation opposite the detector. Thus, when employing the type of detectors mentioned above, misleading measurements may be obtained.

In accordance with the present invention, the desired thermal information is obtained by detecting, in a borehole traversing formations of interest, the infrared radiation emitted by the formations and emanating from the borehole walls into the borehole. The radiation detected is a measure of the formation temperature.

More particularly, the earth's formations radiate, in the infrared region, energy having a spectrum approaching that of a black body. Thus, the shape of the spectrum is dependent upon the formation temperature. A measure of the infrared radiation emitted from the formations is indicative of the formation temperature.

In carrying out the invention, the borehole measurements are made preferably soon after the borehole is formed and before equilibrium is established in order to obtain optimum measurements of the transfer of infrared radiation from the formations into the borehole.

The system for carrying out the measurements described above comprises a detector sensitive to the infrared radiation emitted by the formations and means for positioning the detector within the borehole. Since infrared radiation detectors are sensitive to individual radiation quanta and do not depend upon heat conduction to obtain a measurement, improved temperature measurements are obtained. In the preferred embodiment, the radiation detector employed is of the photodetector type.

In continuous logging operations, the detection system and technique of the present invention have particular application in locating formation characteristics such as fractures. More particularly, fractures generally exhibit conductivity different from that of the surrounding formations. Thus, the radiant energy or heat flow in the region of fractures is expected to be different from that of the surrounding formations.

For a more complete understanding of the present invention and for further objects and advantages thereof, reference may now be had to the following description taken in conjunction with the accompanying drawings wherein:

FIGURE 1 illustrates a borehole system for carrying out the present invention; and FIGURE 2 illustrates a modified borehole system.

Referring now to FIGURE 1, the system of the present invention for obtaining a measure of the temperature of the subsurface formations comprises an infrared detecting system 10 housed in a borehole tool 11. The measurements desired are obtained by lowering the tool 11 into the borehole 12 to detect infrared radiation emanating from the borehole walls. Preferably, the tool 11 is lowered into the borehole soon after it is formed (preferably of the order of days after the borehole is completed) and before equilibrium is established. At this time, the transfer of heat from the formations to the interior of the borehole is at an optimum.

The detector employed preferably is a photodetector and one which is sensitive to a wide range of infrared radiation. In air-filled boreholes, sensitivity is desired at least in the range from about 8-14 microns. Sensitivity within this range is desired since it coincides at least in part with a well-known atmospheric window.

In a more detailed description, the detecting system comprises a window 13 sealed against the wall of the tool adjacent aperture 11a and selected to pass infrared radiation in the range of interest. The system also includes a focusing system 14 and a photodetector 15. The output of the detector is an electrical signal representative of the infrared radiation detected. In the present system, this output is transmitted to the surface where a record is obained of the radiation detected.

The particular borehole system shown in FIGURE 1 is adapted for carrying out continuous well logging operations over great depths. In this system, the tool is moved along the borehole by a cable 16 wound and unwound upon a drum 17 driven by motor 18 and mechanical connection 19. The output of the detector is transmitted to the surface by way of amplifier 20 and conductor 21 of cable 16. At the surface, signals from the conductor 21 are fed into a continuous trace recorder 22 by way of slip ring 23, brush 24, and amplifier 25. The chart of the recorder is driven in correlation with depth by a sheave 26 and connection 27. Trace 28 is recorded in correlation with depth and is indicative of infrared radiation detected along the borehole.

The well logging system shown may be employed in one embodiment to detect fractures in the formations and hence to locate potential oil-producing formations. More particularly, various formations traversed by the borehole will exhibit different temperatures dependent upon factors such as the heat conductivity of the formations and of the fluids in the formations. In this respect, the presence of fractures is expected to produce large temperature variations since they generally provide good heat conduction paths.

FIGURE 2 illustrates a modified borehole system which may be employed for logging boreholes filled with borehole liquid. As shown, a spring 30 is provided to urge the tool close to the borehole wall to reduce the effect of the liquid on the measurements obtained.

In the above description, a single detector has been disclosed as located within the borehole tool. In logging operations, it is to be understood, however, that a plurality of detectors, for example three detectors spaced 120° apart, may be employed to detect radiation at a plurality of angular positions. Such an arrangement will increase the probability of detecting fractures in the formations if they exist or may be employed to determine the dip of the fractures. The output of each detector may be recorded separately. In addition, suitable orientating means may be employed to determine the orientation of the tool while logging.

In one embodiment, the photodetector employed may be of mercury-doped germanium which is sensitive to infrared radiation within the range of about 2–14 microns. Other suitable germanium detectors sensitive to a wide range of infrared radiation from about 2 microns and extending beyond 14 microns up to 40 microns are disclosed in Infrared Physics and Engineering, Jamison, McFee, Plass, Grube, and Richards, 1963, pp. 157–181.

For further information concerning infrared detecting systems of the photodetector type, reference may also be had to International Science and Technology, April 1963, pp. 26–27. A suitable window 13 for passing infrared radiation over a wide band may be of diamond, for example, as disclosed in the International Science and Technology reference.

Now that the invention has been described, modifications will become apparent to those skilled in the art, and it is intended to cover such modifications as fall within the scope of the appended claims.

What is claimed is:

1. A method of logging for fractures in the formations traversed by a borehole, comprising the steps of:
within said borehole detecting the naturally occurring infrared radiation emanating from the walls of the borehole, and recording in correlation with depth a function representative of the infrared radiation detected to obtain an indication of fractures in said formations.

2. A method of claim 1 wherein:
said logging operations are carried out a short time period after said borehole is formed and before equilibrium is established.

3. A method of logging for fractures in the formations traversed by a borehole, comprising the steps of:
within said borehole detecting the naturally occurring infrared radiation at least in the spectral range of about 8–14 microns and emanating from the walls of said borehole, and
recording in correlation with depth a function representative of the infrared radiation detected to obtain an indication of fractures in said formations.

4. A method of logging for fractures in the formations traversed by a borehole, comprising the steps of:
locating a passive infrared detector system within said borehole,
continuously moving said detector system along a portion of said borehole to detect for the naturally occurring infrared radiation emanating from the walls of said borehole, and
continuously recording in correlation with depth a function indicative of the infrared radiation detected and representative of the heat emanating from the walls of said borehole to locate fractures in said formations.

5. A method of logging for fractures in the formations traversed by a borehole comprising the steps of:
from each of a plurality of different angular positions within a borehole and at a depth of interest, detecting the naturally occurring infrared radiation emanating from the walls of said borehole, and
in response to said detecting operations carried out from each angular position and at each depth zone of interest recording, in correlation with depth, measurements representative of the infrared radiation detected from each of said plurality of angular positions to obtain an indication of fractures in said formations.

6. A method of logging for fractures in the formations traversed by a borehole comprising the steps of:
locating a plurality of infrared detectors in a borehole at a plurality of spaced angular positions,
continuously moving said plurality of infrared detectors along a portion of said borehole to detect for the naturally occurring infrared radiation emanating from the walls of said borehole at a plurality of angular positions, and
continuously and separately recording in correlation with depth the output of each detector to obtain an indication of fractures in said formations.

7. A method of logging for fractures in the formations traversed by a borehole comprising the steps of:
locating in a borehole a borehole tool including three infrared detectors spaced apart about 120°,
continuously moving said tool including said infrared detectors along a portion of said borehole to detect for the naturally occurring infrared radiation emanating from the walls of said borehole at three angular positions, and
continuously and separately recording in correlation with depth the output of each detector to obtain three separate records representative of the heat emanating from the walls of said borehole at three angular positions to obtain an indication of fractures in said formations.

8. The method of claim 7 comprising the step of:
determining the orientation of said borehole tool while logging.

UNITED STATES PATENTS

References Cited

| | | | |
|---|---|---|---|
| 2,346,481 | 4/1944 | Garrison | 73—152 X |
| 2,769,918 | 11/1956 | Tittle | 250—83.3 |
| 2,972,251 | 2/1961 | Harper | 73—154 |
| 3,164,988 | 1/1965 | Cook | 73—154 |
| 3,245,261 | 4/1966 | Bytex et al. | 73—355 |

OTHER REFERENCES

McDonald, R. K.: Infrared Radiometry, from Instruments and Control Systems, September 1960, pages 1527–1530.

RICHARD C. QUEISSER, *Primary Examiner.*

J. W. MYRACLE, *Assistant Examiner.*